United States Patent [19]

Nobileau

[11] Patent Number: 5,425,559
[45] Date of Patent: Jun. 20, 1995

[54] RADIALLY DEFORMABLE PIPE

[76] Inventor: Philippe Nobileau, 40 Chemin du Vinaigrier, 06300 Nice, France

[21] Appl. No.: 312,450

[22] Filed: Sep. 26, 1994

Related U.S. Application Data

[63] Continuation of Ser. No. 962,581, filed as PCT/FR91/00542, Jul. 4, 1991, published as WO 92/01139, Jan. 23, 1992, abandoned.

[30] Foreign Application Priority Data

Jul. 4, 1990 [FR] France ................. 90 08474

[51] Int. Cl.⁶ .............. F16L 39/00; F16L 37/08; F16L 31/00
[52] U.S. Cl. .................... 285/330; 285/921; 285/331; 285/423
[58] Field of Search ............ 285/921, 330, 331, 423, 285/137.1

[56] References Cited

U.S. PATENT DOCUMENTS

| | | |
|---|---|---|
| 2,410,786 | 11/1946 | Mallory . |
| 2,537,284 | 1/1951 | Schuder . |
| 3,087,747 | 4/1963 | Novotny . |
| 3,359,013 | 12/1967 | Knox . |
| 3,784,235 | 1/1974 | Kessler . |
| 4,298,221 | 11/1981 | McGugan ................ 285/921 |
| 4,525,001 | 6/1985 | Lumsden et al. ........... 285/921 |
| 4,570,705 | 2/1986 | Walling . |
| 4,601,491 | 7/1986 | Bell, Jr. et al. ............ 285/921 |
| 4,629,221 | 12/1986 | Lumsden et al. .......... 285/921 |
| 4,779,902 | 10/1988 | Lee ........................ 285/921 |
| 4,796,669 | 1/1989 | St. Onge .................. 285/921 |
| 5,180,197 | 1/1993 | Thompson, Jr. ........... 285/921 |
| 5,337,823 | 8/1994 | Nobileau ................. 166/277 |

FOREIGN PATENT DOCUMENTS

| | | |
|---|---|---|
| 512361 | 5/1980 | Australia . |
| 592474 | 1/1934 | Germany . |
| 106476 | 8/1918 | United Kingdom . |
| 1462188 | 1/1977 | United Kingdom . |
| 2016105 | 9/1979 | United Kingdom . |

*Primary Examiner*—Eric K. Nicholson

[57] ABSTRACT

The radially deformable pipe of the invention is made up of at least two sections releaseably coupled end to end. The end of one of the sections has, over a predetermined axial length, an internal perimeter substantially equal to the external perimeter of the end of the other section, so as to form a male end adapted to be inserted in a female end. The extreme margin of the male end includes a locking bead adapted to fit in sealed manner in an internal groove of the female end behind a locking bead including the edge of this groove (9). The extreme margin of the female end is fitted into an external groove of the male end spaced from the locking bead by the said axial length.

6 Claims, 2 Drawing Sheets

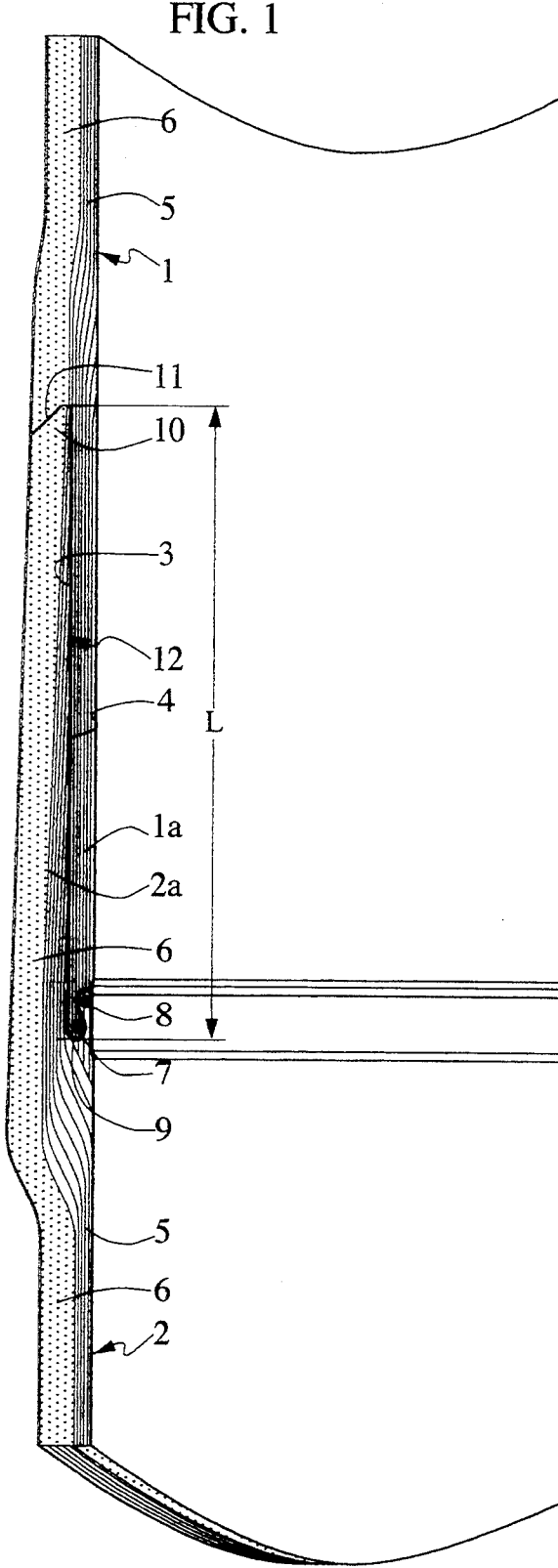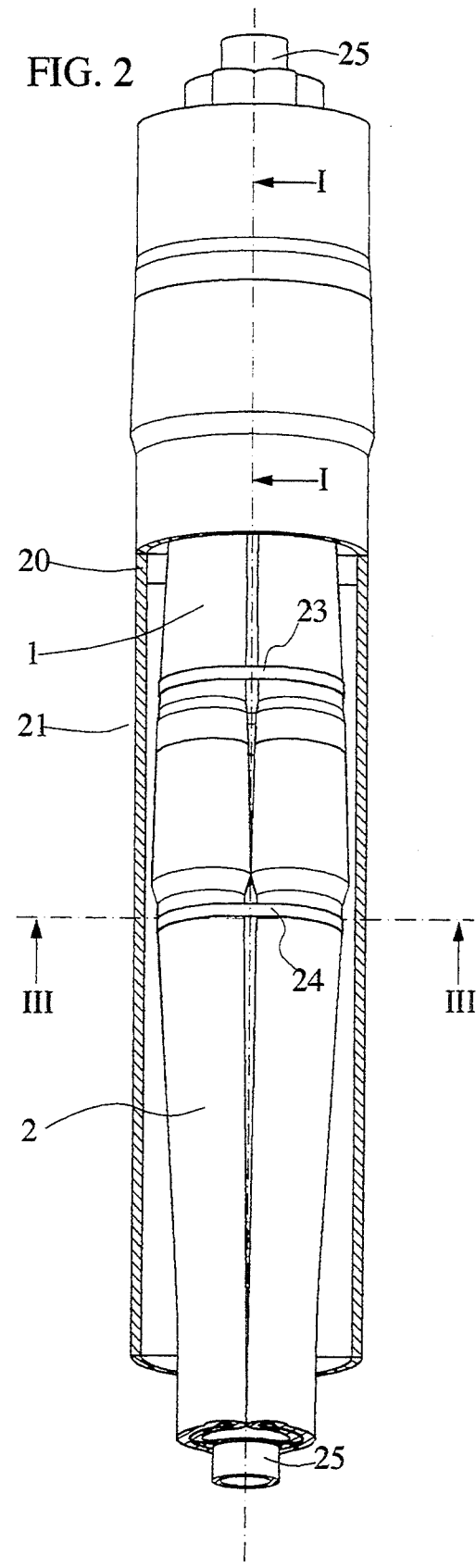

RADIALLY DEFORMABLE PIPE

This application is a continuation of application Ser. No. 07/962,581, filed as PCT/FR91/00542, Jul. 4, 1991, published as WO 92/01139, Jan. 23, 1992, now abandoned.

BACKGROUND OF THE INVENTION

In the activities of drilling for oil there is an operation consisting in lining the drilled well by a pipe firstly to retain the formation and secondly to contain the pressure of a blowout should this occur.

At present, such "casing" is made of metal and is lowered into the well progressively as work proceeds, by adding a section of pipe to the top of the column of pipe that has already been lowered into the well.

The same applicant's U.S. patent application 07/946,423, of Nov. 6, 1992 now U.S. Pat. No. 5,337,823, proposes a system of casing in which the wall of the pipe is radially deformable, such that the casing can be lowered down the well in its folded state, i.e. with reduced radial size; once it is in place, it is inflated so that its wall regains a cylindrical shape. The annular space between the formation and the pipe is then filled with cement. The advantage in such a system lies in the fact that each successive length of casing is formed during drilling with pipe of the same diameter, the folded pipe being able to pass through the unfolded pipe as previously installed. The consequence of such single-diameter casing is a well that is always of the same, relatively small diameter, resulting in economies in relation to tools, to drilling time, and to the volume of drilled material.

Before use, the casing is stored on large reels, in the folded state, and thus in a relatively small volume, much smaller than that occupied by conventional casing.

A completed casing, whose length may vary from some tens of meters to several kilometers, is prepared by pre-assembling a plurality of coupled sections end to end so as to obtain the desired length, which is then stored on a reel, awaiting placement in the well.

It has accordingly been necessary to provide means for effecting this coupling, while preserving the ability of the pipe to be radially deformed. These means should also be releasable. On site, it is often necessary to adjust the length of the casing to be lowered down the well depending on the length of the drilling actually effected, which can exceed or fall short of the expected target, which target has already determined the length of the casing to be prepared. It is thus necessary to increase or reduce this prepared length—and at the drilling site. To do this, a coupling is released to remove the excess length (or the special endpiece which this kind of casing also includes) and an additional length or the special endpiece is then connected.

The present invention thus concerns a pipe equipped with releasable coupling means and a use of this pipe in oil well casing in accordance with U.S. patent application 07/946,423 now U.S. Pat. No. 5,337,823.

SUMMARY OF THE INVENTION

Thus, in a first aspect, the present invention provides a radially deformable pipe made up of at least two sections releaseably coupled end to end, characterized in that the end of one of the sections has, over a predetermined axial length, an internal perimeter substantially equal to the external perimeter of the end of the other section, so as to form a male end adapted to be inserted in a female end, in that the extreme margin of the male end includes a locking bead adapted to fit in sealed manner in an internal groove of the female end, behind a locking bead included in the edge of this groove, and in that the extreme margin of the female end is fitted into an external groove of the male end spaced from the locking bead by the same axial length.

A coupling formed in this way is flexible and thus allows radial folding of the pipe in its vicinity while ensuring a tight joint. It thus maintains the ability of the pipe to be inflated as is described in the above-mentioned patent.

In a preferred embodiment, the wall of the pipe is made of composite material based on orientated fibers, defining an inside first layer in which the fibers are orientated longitudinally and an outside second layer in which the fibers are orientated circumferentially, the male end lacking the second layer.

This results in intimate contact between the male and female ends when the pipe is inflated in position in the drilled well, the fibers of the male part being pressed firmly against the fibers of the female end, thereby setting up large frictional forces preventing the male part sliding in the female part.

In a second aspect, the present invention provides casing comprising at least two releaseably connectable sections, each section comprising a section of pipe equipped with coupling means as described above and an inside duct section, on to which the section of pipe is folded. According to a particular characteristic of this assembly, each end of the duct section includes coupling means, the coupling means of the section contained within a male end being located beyond the extreme margin of this end, while the coupling means of the section contained within a female end are located inside the said groove. This design allows access to these coupling means while keeping the outside tubular sheaths uncoupled, the male part folded on to the inside duct section and the female part in its unfolded state.

Since the outside pipe in the ordinary part of each section of casing is kept in its folded state on to the inside duct, by means of a vacuum in the space separating this duct from the outside pipe, each section of casing has a membrane extending between the inside duct an the outside sheath in the vicinity of its coupling ends, allowing the coupling to be made without affecting the evacuated space.

BRIEF DESCRIPTION OF THE DRAWINGS

The invention will be better understood from the description of an embodiment given below, which allows its advantages and secondary characteristics to be appreciated.

Reference is made to the accompanying drawings, in which:

FIG. 1 is a longitudinal section on line II in FIG. 2 of an unfolded casing of the invention, cemented in place, at the level of a coupling;

FIG. 2 shows a coupling of a section of casing being lowered down a well being drilled through a part of the well which has already been cased;

DESCRIPTION OF THE PREFERRED EMBODIMENT

Figure 4:
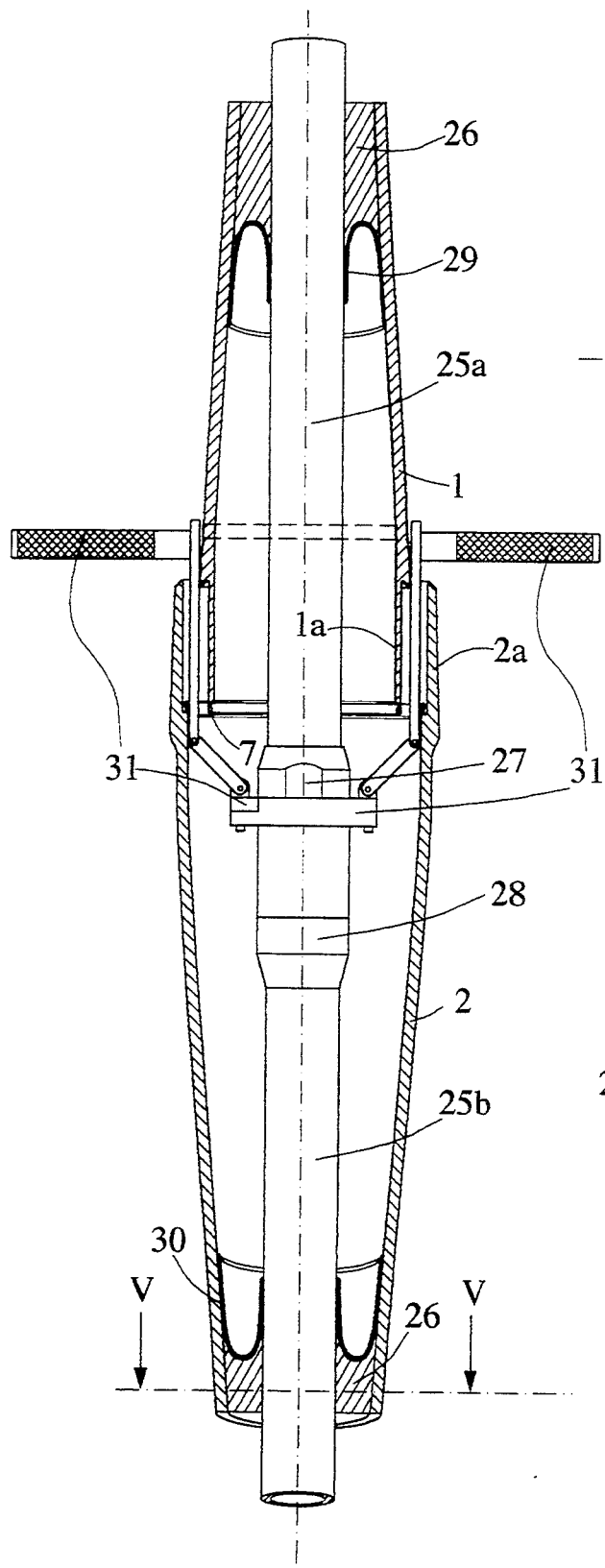
FIG. 4 illustrates schematically, in a section view, an operation of coupling two sections of casing together.

The drawings show an application of the means of the invention to casing, particularly as defined in detail in the application 90 06269 but the invention also concerns a single deformable pipe as shown in its unfolded state in FIG. 1. In this Figure, 1 and 2 denote two sections coupled to each other. The upper section 1 has a coupling end 1a whose outside perimeter (or its diameter when it is unfolded) is substantially equal to the inside perimeter (or diameter) of the coupling end 2a of the section 2. The male end 1a thus fits perfectly into the female end 2a. To introduce it, it is easy to allow the female end 2a to open while keeping the male end 1a folded, as can be seen in FIG. 4.

The length L over which the two surfaces 3 and 4 extend in contact with each other is calculated as a function of the frictional force desired between these surfaces when the pipe is inflated, having regard also to the condition of these surfaces and the materials which are used. In this connection, it is noted that the wall of the sections of pipe 1, 2 is preferably made of a composite material based on orientated fibers in a matrix. This wall has an inside layer 5 in which the fibers are oriented longitudinally and an outside layer 6 in which the fibers are orientated circumferentially. The structure is thus "reinforced" so as to resist elongation under the action of its own weight and of the weight of the pipe-inflating liquid, and to resist circumferential elongation due to the internal pressure.

It should be noted in FIG. 1 that, in the region where the ends fit together, the wall of the male end 1a lacks the outside layer 6, so that the internal pressure acts on the longitudinal fibers, which tend to be pressed hard against the inside surface of the other end, which comprises its outside layer 6, forming a hoop counteracting radial expansion.

Axial locking between the two sections 1 and 2 and tightness of the connection are provided by two locking beads 7 and 8. The bead 7 is formed by the extreme margin of the male end 1a and is reinforced by an inextensible strand in the manner of a bead of a tire. The same applies to the bead 8, which is formed by the inside edge of an internal groove 9 in the female end 2a, which accommodates the bead 7 in such a way that the latter engages behind and under the bead 8 without being able to disengage therefrom.

At the other end of the coupling, the extreme margin 10 of the female end 2a is fitted into a groove 11 of complementary shape, formed on the outside of the male end 1a. Since the wall of the female end 1a is shaped like a tulip which converges upwardly, and since the surfaces 3 and 4 are cylindrical, the inside layer 5 tapers off in the region of this end 2a, so that the margin 10 is formed solely by the outside layer 6 and is thus very resistant to elongation and to circumferential compression.

The groove 11 is actually delimited by the outside surface of the inside layer 5 and a surface cut conically in the end of circumferential-fiber outside layer 6 of the section 1. The margin 10 is likewise conical and is received within the groove 11. This fit is likewise very resistant to circumferential stresses. In between the contacting surfaces 3 and 4 a layer of adhesive 12 is applied to increase the strength of the connection. This adhesive allows disconnection of the coupled parts, so long as the pipe has not been inflated.

In FIG. 2 there is shown, within installed casing 20 cemented in a drilled well 21, a portion of the casing element 22 which is to be installed under the installed casing 20. The element 22 comprises at least two coupled-together sections 1 and 2, the region of the joint being folded-in radially and being kept in this state by encircling bands 23 and 24.

Figure 3:
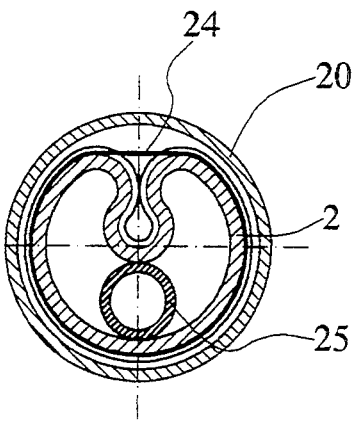
FIG. 3 is a section on line III—III in FIG. 2.
Figure 5:
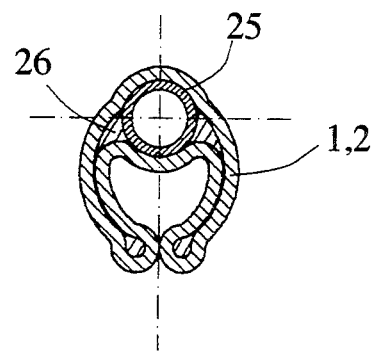
FIG. 5 is a section on line V—V of FIG. 4.

A section of casing comprises an outside sheath in the form of the pipe 1, 2, and an inside duct 25, on to which the outside sheath is folded radially, as is shown in FIGS. 3 and 5. FIG. 5 is a section through an ordinary portion of the element of casing with the outside pipe kept folded by evacuating the space 26 between the duct 25 and the outside sheath 1, 2. FIG. 3 is a section in the region of the coupling, where the folded state of the outside pipe 1, 2 is maintained by encircling bands 24.

FIG. 4 shows the organization of the invention which allows two sections 25a and 25b of the duct 25 to be coupled together. To do this, the ends of the sections are fitted with coupling means of the nature of a pipe union, the end of the section located in the male part 1a carrying its coupling means 27 beyond the extreme margin 7 of the male part. The other coupling means 28 carried by the other section 25b are for their part located inside the female end 2a of the pipe 2, inside the groove 9. Membranes 29 and 30 allow the spaces such as 26 which are evacuated to be isolated from the coupling regions.

An operation of adjusting the length of a section of casing is explained briefly below.

The sections on the storage reel are coupled as shown in FIG. 2. To modify the length of the casing, a start is made on opening a joint by cutting at least the band 24 of the female end 22. The outside pipe coupling is then opened, making use of the deformability of the wall both to get the margin 10 out of the groove 11 and to separate the locking beads 7 and 8. The female part can then be opened out radially as is illustrated in FIG. 4. It is possible to insert a tool 31 into the space between the part 2 and the part 1 which remains tied (or which has been banded again), in order to be able to manipulate the joint 27, 28 and separate the two sections 25a and 25b.

One can then introduce into the end 2 either the special endpiece of casing, if the adjustment consists in shortening, or an extension of the casing and, using the tool 31, proceed to couple the inside duct, then by deforming the male end, proceed to engage the beads 7 and 8 and the margin 10 in the groove 11, making use of the deformability of the wall. Finally, the bands 23 and 24 are replaced to fold the outside pipe on to the duct 25, having for example provided means between the two parts 1 and 2 to extract the air trapped in the coupling region at the time of applying the hoops. (These means may be an exhaust pipe which is withdrawn after a sufficient vacuum has been obtained or a chemical substance absorbing the air in the coupling region.)

Finally, it may be advantageous to put a mineral fill, e.g. in powder form, inside the coupling region, which prevents this region being crushed while the coupling is being lowered down a well full of mud.

I claim:

1. A pipe having a radially deformable and foldable wall made up of at least two sections releaseably coupled end to end, in which the end portion of one of the sections has, over a predetermined axial length, an internal perimeter substantially equal to the external perimeter of the end section of the other section, so as to form a male end portion adapted to be inserted in a female end portion, wherein said male end portion includes a distal margin shaped as a locking bead comprising a inextensible strand and a proximal external groove spaced from said locking bead by said predetermined axial length and wherein said female end portion includes a proximal internal groove having an inside edge shaped as a locking bead including an inextensible strand and a distal margin so that said distal locking bead is adapted to fit in sealed manner in said internal groove behind said inside edge and said distal margin of said female end portion is adapted to fit into said proximal external groove.

2. A pipe according to claim 1, wherein said wall is made of composite material which comprises orientated fibers, defining an inside first layer in which the fibers are orientated longitudinally and an outside second layer in which the fibers are orientated circumferentially, said male end portion lacking the second layer.

3. A pipe according to claim 2, wherein the wall of said female portion is of conical form over the axial predetermined length converging towards its distal margin, said inside layer becoming thinner from said proximal groove up to said distal margin.

4. A pipe according to claim 3, wherein said distal margin of the female end portion and the groove of said male end portion are triangular in radial section and are formed in the outside layer of each wall.

5. Casing comprising at least two releaseably connectable sections, each section comprising a section of pipe having end male and female portions, according to claim 1 and an inside duct section on to which the wall of said each section of pipe is folded, wherein the duct section includes end coupling means, the coupling means which are contained within a male end section of pipe being located beyond said distal locking bead while the coupling means which are contained within a female end section are located beyond said proximal internal groove with respect to the distal margin of said female end portion.

6. Casing according to claim 5, wherein each section of pipe has a membrane extending between the inside duct and the wall of the pipe being located inside the casing opposite to each margin with respect to and axially spaced from each respective groove.

* * * * *